United States Patent Office 3,332,943
Patented July 25, 1967

3,332,943
CARBAMOYLTHIO DERIVATIVES
Kazuo Konishi, Suita, and Tetsuya Okutani and Takenobu Soma, Nishinomiya, Japan, assignors to Takeda Chemical Industries, Ltd., Osaka, Japan
No Drawing. Filed Oct. 18, 1965, Ser. No. 497,529
Claims priority, application Japan, Oct. 21, 1964, 39/60,018
6 Claims. (Cl. 260—243)

This invention relates to novel compounds which are useful as pesticides. More particularly, the present invention relates to carbamoylthio derivatives represented by either of the formulae:

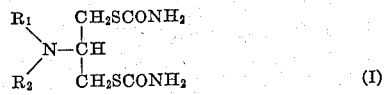

and

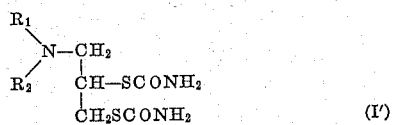

wherein each of $R_1$ and $R_2$ stands for a lower alkyl group having up to six carbon atoms, or wherein $R_1$ and $R_2$ together with the nitrogen atom form a heterocyclic ring, and to salts of these compounds. The pesticidal activity of these several compounds renders them useful for, e.g. household, agricultural and sanitary purposes.

We, previously, found that a compound having either of the formulae:

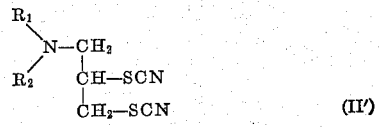

and

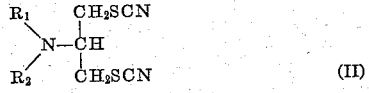

wherein each of $R_1$ and $R_2$ has the same meaning as above, and salts thereof, have a superior pesticidal activity and are useful for e.g. household, agricultural and sanitary purposes. According to the present invention, however, toxicity to homothermal animals of the compounds of the Formulae II and II' can be remarkably lowered by replacing each —SCN group with an —SCONH$_2$ group, without lowering its pesticidal activity.

The principal object of the present invention is, therefore, to provide novel compounds represented by either of the Formulae I and I' and salts thereof, which have a remarkably low toxicity to homothermal animals and an excellent pesticidal activity. Further object is to provide an insecticidal composition of a remarkably low toxicity to homothermal animals, which can desirably be applied to agricultural, household and sanitary purposes to combat harmful insects, the composition being characterized by containing one or more of the compounds I and I', including those in the form of acid salts.

Each of the radicals $R_1$ and $R_2$ in the Formulae I and I' either stands for a lower alkyl group, or both $R_1$ and $R_2$ together with the adjacent nitrogen atom form a heterocyclic ring, and are exemplified by, for example, methyl, ethyl, propyl, isopropyl, butyl, t-butyl, amyl, and hexyl, as the lower alkyl groups, and by piperidino, pyrrolidino, morpholino and thiamorpholino, as the nitrogen groupcontaining rings.

The compounds of the Formulae I and I' are exemplified by, for example:

1,3-bis-carbamoylthio-2-dimethylaminopropane,
2,3-bis-carbamoylthio-1-dimethylaminopropane,
1,3-bis-carbamoylthio-2-diethylaminopropane,
2,3-bis-carbamoylthio-1-diethylaminopropane,
1,3-bis-carbamoylthio-2-dipropylaminopropane,
1,3-bis-carbamoylthio-2-diisopropylaminopropane,
1,3-bis-carbamoylthio-2-dibutylaminopropane,
1,3-bis-carbamoylthio-2-diamylaminopropane,
1,3-bis-carbamoylthio-2-dihexylaminopropane,
1,3-bis-carbamoylthio-2-methylethylaminopropane,
2,3-bis-carbamoylthio-1-methylethylaminopropane,
1,3-bis-carbamoylthio-2-piperidinopropane,
2,3-bis-carbamoylthio-1-piperidinopropane,
1,3-bis-carbamoylthio-2-pyrrolidinopropane,
1,3-bis-carbamoylthio-2-morpholinopropane,
1,3-bis-carbamoylthio-2-thiamorpholinopropane, These compounds can form salts with various acids, the acids being examplified by, for example, inorganic acids such as hydrochloric, hydrobromic, hydroiodic, chloric, bromic, iodic, perchloric, perbromic, periodic, sulfuric, nitric, phosphoric and arsenic acids, and by organic acids such as maleic, citric, tartaric, oxalic, benzenesulfonic, toluenesulfonic, ethanesulfonic and picric acids. The compounds of the Formulae I and I' are prepared by treating the corresponding compounds of the Formulae II and II' with a mineral acid such as hydrochloric acid, hydrobromic acid, hydroiodic acid and sulfuric acid. More particularly, they can be prepared, for example, by any of the following processes:

(1) Blowing hydrogen halide such as hydrogen chloride, hydrogen bromide and hydrogen iodide into a solution or suspension in water or lower aliphatic alcohol such as methanol and ethanol containing the corresponding compound of either of the Formulae II and II', then, desirably after heating, separating the product from the resultant mixture;

(2) Blowing excess of hydrogen halide as mentioned above into an aqueous solution or suspension containing the corresponding compound of either the Formulae II and II', then, after neutralizing if necessary the resultant mixture with alkaline material (e.g. sodium hydroxide, potassium hydroxide, sodium hydrogencarbonate and sodium carbonate), keeping the mixture at room temperature (about 20° to about 30° C.) or under cooling; or (3) Dropping the corresponding compound of either of the Formulae II and II' into concentrated sulfuric acid containing from about 15 to about 20% (v./v.) of water, then pouring the mixture into cooled water. Thus-obtained compound is a salt, and it may be changed into a free base by a suitable procedure per se known. By neutralizing the mixture mentioned above, a free base is directly obtained.

The present compounds of either of the Formulae I and I', and the salts thereof have remarkably low toxicity to homothermal animals and excellent insecticidal activity, and therefore, are useful as a low toxic pesticide for household, agricultural and sanitary purposes.

When the compounds are brought into practice as pesticides for agricultural and sanitary purposes, the compounds are generally processed so as to fit the intended purposes to form compositions, for example, wettable powder, solution, emulsifiable solution, dust or aerosol.

For the preparation of the compositions, a variety of adjuvants may be employed. One or more of the compounds are dissolved or dispersed in an appropriate liquid adjuvant when used as solution, emulsifiable solution, or aerosol. Liquid adjuvants to be used as solvents comprise, for example, water; lower alcohols (such as methanol, ethanol, isopropanol, butanol, glycerol or ethylene glycol); ketones (such as acetone, methyl ethyl ketone, cyclohexanone or cyclopentanone); ethers (such as dioxane, tetrahydrofuran, ethylene glycol monomethyl ether or diethylene glycol monomethyl ether); aliphatic hydrocarbons (such as n-hexane, gasoline, kerosene, fuel oil, lubricating oil or machine oil); aromatic hydrocarbons (such as benzene, toluene, xylene, solvent naphtha or methyl naphthalene); essential oils; terpenes; chlorinated biphenyl or cottonseed oil. The solvent is often constituted by a mixture of the above-enumerated solvents, since the solvent to be used is desired to be not only excellent in its solubility but also of reduced toxicity for plants or human bodies.

For preparing dust composition of the compounds, there are usually employed dust diluents or carriers. One or more of the compounds are finely pulverized, for example, in a ball mill, edge runner or impact pulverizer, and the thus pulverized compounds are admixed with dust diluents or carriers. As the diluents or the carriers, for example, vegetable powder (such as soybean flour, wheat flour, tobacco powder, walnut flour or saw dust), clay (such as kaolin, kaolinite, saponite, vermiculite, beidellite, montmorillonite—bentonite or Fuller's earth— or attapulgite), talc, pyrophyllite, calcium lime, magnesium lime, diatomaceous earth, silica, hydroxyapatite, calcium carbonate, dolomite, calcite, calcium sulfate, hydrated alumina, carbon black or sulphur can be used.

Another kind of adjuvant is surface active agent which is used as sticking or developing agent, emulsifier, or solubilizer for improving the effect or the stability of compositions. Among commercially available surface active agents, salts of sulfonated castor oil, salts of alkylaryl sulfonates or non-ionic surfactants such as polyoxyethylene diaryl ether, polyoxyethylene alkylaryl ether and polyoxyethylene sorbitan monoacylate (the acyl group having 10 to 18 carbon atoms) are preferably used as emulsifying and solubilizing agents for the compositions of the present invention.

The pesticidal compositions may contain other pesticides (such as benzenehexachloride (BHC), dichlorodiphenyltrichloroethane (DDT), aldrin, dieldrin, endrin, pyrethrin, rotenone, parathion or other organic phosphorus poisons), ascaricides, nematocides, fungicides, herbicides, attractants or repellents. They may also contain growth hormones, fertilizers, or perfumes, all these additions being considered the adjuvants in the compositions of the instant invention.

The compounds I or I' or compositions thereof of the present invention have the effect of killing a wide variety of insects, mites and nematodes, and exterminating those harmful animals (plant-feeding insects, etc.) exemplified below or at least lessening remarkably the number of surviving animals:

Colorado potato beetle (*Leptinotarsa decemlineata*),
Large 28-spotted lady beetle (*Epilachna vigintioctomaculata*),
28-spotted lady beetle (*Epilachna sparsa orientalis*),
Striped flea beetle (*Phyllotreta striolata*),
Cucurbit leaf beetle (*Aulacophora femoralis*, adult),
Rape leaf beetle (*Acrothinium gackkwitchii*, adult),
Red bean beetle (*Callosobruchus chinensis*),
German cockroach (*Blattela germanica*),
Rice leaf beetle (*Lema oryzae*),
House fly (*Musca domestica*),
Cabbage sawfly (*Athalia rosae japonensis*, larva),
Rice stem borer (*Chilo suppressalis*),
Tobacco cutworm (*Plodenia litura*),
Rice plant skipper (*Parnara guttata*, larva)
Rice green caterpillar (*Naranga aenescens*, larva),
Cabbage armyworm (*Barathra brassicae*, larva),
Giant bagworm (*Crytothelea formosicola*, larva),
Tea bagworm (*Cryptothelea minuscula*, larvae),
Pale clouded yellow worm (*Colias hyale poliographus*, larvae),
Cabbage worm (*Pieris rapae*, larva),
Citrus red mite (*Petranychus citri*),
Soybean aphid (*Aphis glycines*),
Citrus leaf miner (*Phyllocnistis citrella*),
Peach leaf miner (*Lyonetia clerkella*),
Turnip aphid (*Rhapalosiphum pseudobrassicae*),
Two-spitted mite (*Tetranychus bimaculatus*), etc.

Compositions for direct application to vegetation contain from 0.1% to 10% or more of the compound(s) I or I' by weight. When the composition is designed as a concentrate for preparation of sprays or more dilute dusts, the contents of the compound(s) I or I' vary from 10% to 90% by weight.

In the following, the relationship between parts by weight and parts by volume is the same as that between grams and milliliters.

*Example.*—Part I (*the preparation of the new carbamoylthio derivatives*)

(1) Hydrogen chloride gas is introduced for 2 hours into 12 parts by weight of 1,3-dithiocyanato-2-dimethylaminopropane hydrochloride suspended in 30 parts by volume of methanol in order to cause a reaction to take place. Upon completion of the ensuing reaction, the methanol is distilled off under reduced pressure from the reaction mixture to obtain a residue which is then dried. The residue is recrystallized from methanol to give 13.7 parts by weight of colorless needle-like crystals of 1,3-bis-carbamoylthio-2-dimethylaminopropane hydrochloride which melts at 175° C.

(2) Hydrogen chloride gas is introduced for 9 hours into a mixture of 3.6 parts by weight of water and 23.7 parts by weight of 1,3-dithiocyanato-2-dimethylaminopropane hydrochloride to allow a reaction to take place. After standing at room temperature for a while, the obtained glass-like reaction mixture is mixed with 99% ethanol under stirring to give crystals which are separated by filtration and purified in the same manner as in (1) to obtain 12 parts by weight of colorless needle-like crystals of 1,3-bis-carbamoylthio-2-dimethylaminopropane hydrochloride having a melting point of 175° C.

Elementary analysis.—$C_7H_{16}N_3O_2S_2Cl$, calculated: C, 30.70; H, 5.89; N, 15.35. Found: C, 30.55; H, 5.85; N, 15.27.

(3) Hydrogen chloride gas is introduced for 7 hours into a mixture of 1.8 parts by weight of water and 11.9 parts by weight of 1,3-dithiocyanato-2-dimethylaminopropane hydrochloride to allow a reaction to take place. Upon completion of the reaction, the reaction mixture is dissolved in 20 parts by volume of water, neutralized with sodium bicarbonate, and kept standing under ice-cooling to precipitate crystals. After filtration, the crystals are dried and recrystallized from 99% ethanol to give 5.8 parts by weight of colorless prisms of 1,3-bis-carbamoylthio-2-dimethylaminopropane having a melting point of 130 to 131° C.

Elementary analysis.—$C_7H_{15}N_3O_2S_2$, calculated: C, 35.41; H, 6.37; N, 17.70. Found: C, 35.41; H, 6.18; N, 17.79.

(4) Hydrogen chloride gas is introduced for 8 hours into 6 parts by weight of 2,3-dithiocyanato-1-dimethylaminopropane hydrogen chloride suspended in 25 parts by volume of methanol to allow a reaction to take place. Then, similar treatments as in (1), are applied to give 4.3 parts by weight of colorless prisms of 2,3-bis-carbamoylthio-1-dimethylaminopropane hydrochloride having a melting point of 167.5 to 168.5° C.

Elementary analysis.—$C_7H_{15}N_3O_2S_2$, calculated: C, 30.70; H, 5.89; N, 15.35. Found: C, 30.69; H, 5.85; N, 15.85.

(5) 2 parts by weight of 1,3-dithiocyanato-2-dimethylaminopropane is dropped under stirring into 20 parts by volume of 95% (v./v.) concentrated sulfuric acid cooled lower than 0° C. After 30 minutes, the reaction mixture is poured dropwise into ice-cooled water under stirring. Then, similar treatments as in (3), are applied to give 0.6 part by weight of 1,3-bis-carbamoylthio-2-dimethylaminopropane having a melting point of 129 to 130° C.

1.8 parts by weight of thus-obtained 1,3-bis-carbamoylthio-2-dimethylaminopropane and 0.7 part by weight of anhydrous oxalic acid are dissolved in 100 parts by volume of anhydrous methanol under heating. The methanol is then distilled off under reduced pressure to precipitate crystals, which are separated by filtration and dried to obtain 1.6 parts by weight of colorless needle-like crystals of 1,3-bis-carbamoylthio-2-dimethylaminopropane hydrogenoxalate having a melting point of 147 to 148° C. (decomposition).

(6) In similar manners to those in (1) to (5), other carbamoylthio derivatives are synthesized. The results are as follows:

TABLE 1

| Compound: | Melting point (° C.) |
|---|---|
| 2,3-bis-carbamoylthio-1-diethylaminopropane hydrochloride | 167.5–168.5 |
| 1,3-bis-carbamoylthio-2-piperidinopropane hydrochloride | [1] 173–4 |
| 1,3-bis-carbamoylthio-2-morpholinopropane hydrochloride | [1] 172–172.5 |
| 1,3-bis-carbamoylthio-2-thiamorpholinopropane hydrochloride | [1] 180–182 |

[1] Decp.

*Example.*—Part II (*pesticidal activity and toxicity to homothermal animals of the carbamoylthio derivatives*)

(1) An emulsion is prepared by mixing 10 parts by weight of the test compounds with 90 parts by volume of aqueous ethanol mixture containing 20 parts by volume of sorbitan laurate polyoxyethylene ether (Tween 20), and by diluting the emulsion with tap water so as to adjust the concentration of the test compound to 0.05%. Young leaves of Chinese cabbage are immersed in thus-prepared emulsion for several seconds and the wet leaves are allowed to stand in air until they dry. The leaves thus treated are placed in Petri dishes. Test insects, i.e., striped flea beetles (*Phyllotreta striolata*, adults) or cabbage worms (*Pieris rapae*, larvae) are set free on the leaves. After 24 hours, the number of killed insects are respectively counted. Results are as follows:

TABLE 2

| Test Compound | Number of insects Killed/Used | |
|---|---|---|
| | Cabbage worms | Striped flea beetles |
| 1,3-bis-carbamoylthio-2-dimethylaminopropane | 10/10 | 10/10 |
| 1,3-bis-carbamoylthio-2-dimethylaminopropane hydrochloride | 10/10 | 10/10 |
| 1,3-bis-carbamoylthio-2-diethylaminopropane | 10/10 | 10/10 |
| 1,3-bib-carbamoylthio-2-diethylaminopropane hydrogenoxalate | 10/10 | 10/10 |
| 1,3-bis-carbamoylthio-2-methylethylaminopropane | 10/10 | 10/10 |
| 1,3-bis-carbamoylthio-2-methylethylaminopropane sulfate | 10/10 | 10/10 |
| 1,3-bis-carbamoylthio-2-piperidinopropane | 9/10 | 9/10 |
| Control | 0/10 | 0/10 |

(2) One milliliter of acetone solution containing 0.1% (w./v.) of test compound is dropped into the bottom of a Petri dish of 9 cm. in diameter. After the acetone is removed by airing gently, 20 red bean beetles (*Callosobruchus chinensis*) are set free in the Petri dish. After 24 hours, the number of killed insects is counted to calculate an average mortality. Results are as follows:

TABLE 3

| Test compound: | Average mortality percent |
|---|---|
| 1,3-bis-carbamoylthio-2-dimethylaminopropane | 100 |
| 1,3-bis-carbamoylthio-2-dimethylamino propane hydrochloride | 100 |
| 1,3-bis-carbamoylthio-2-diethylamino propane hydrochloride | 100 |
| 1,3-bis-carbamoylthio-2-methylethyl aminopropane hydrogenoxalate | 100 |
| 1,3-bis-carbamoylthio-2-piperidinopropane | 100 |
| 1,3-bis-carbamoylthio-2-pyrrolidinopropane hydrochloride | 100 |
| Control | 0 |

(3) An emulsion is prepared by mixing 10 parts by weight of test compound with 90 parts by volume of acetone solution containing 20 parts by volume of sorbitan laurate polyoxyethylene ether (Tween 20), and by diluting the emulsion with tap water so as to adjust the concentration of the test compound to 0.05%. Potted rice plants are placed on a rotating turn table, and the plants are sprayed with 20 milliliters per pot of the above-prepared emulsion with a spray gun from the distance of 80 cm. from the plants. Some days after spraying, matured eggs of rice stem borer (*Chilo suppressalis*) are placed on thus-sprayed rice plants. After a week from when the eggs are placed on, the stems are cut open to count the number of surviving larvae. Results are as follows:

Table 4

| Test compound | Survival rate (percent) After spraying— | | |
|---|---|---|---|
| | 0 day | 3 days | 5 days |
| 1,3-bis-carbamoylthio-2-dimethylaminopropane | 0 | | 0 |
| 1,3-bis-carbamoylthio-2-dimethylaminopropane hydrochloride | 0 | 0 | 0 |
| 1,3-bis-carbamoylthio-2-diethylaminopropane hydrochloride | 0 | 0 | 0 |
| 1,3-bis-carbamoylthio-2-methylethylaminopropane hydrogenoxalate | 0 | 0 | 0 |
| 1,3-bis-carbamoylthio-2-piperidinopropane | 0 | 0 | |
| 1,3-bis-carbamoylthio-2-pyrrolidinopropane hydrochloride | 0 | 0 | |
| 1,3-dithiocyanato-2-dimethylaminopropane | 0 | 0 | 15.0 |
| 1,3-dithiocyanato-2-dimethylaminopropane hydrogenoxalate | 0 | 0 | 5.0 |
| 0,0,dimethyl,0,(3,methyl-4-nitrophenyl)-phosphorothioate | 0 | 0 | 24.7 |
| Control | | 57.2 | |

(4) Matured eggs of rice stem borer (*Chilo suppressalis*) are placed on rice plants planted in pots. Five days later, the same emulsion as in (3) are sprayed on the rice plants in a similar manner as in (3). Four days after spraying, the stems are cut open to count the number of surviving larvae. Results are as follows:

TABLE 5

| Test compound | Concentration (percent) | Survival rate (percent) |
|---|---|---|
| 1,3-bis-carbamoylthio-2-dimethylaminopropane | 0.0125 / 0.025 | 0 / 0 |
| 1,3-bis-carbamoylthio-2-dimethylaminopropane hydrochloride | 0.0125 / 0.025 | 0 / 0 |
| 1,3-bis-carbamoylthio-2-diethylaminopropane hydrochloride | 0.0125 / 0.025 | 0.9 / 0 |
| 1,3-bis-carbamoylthio-2-methylethylaminopropane hydrogenoxalate | 0.0125 / 0.025 | 1.0 / 0 |
| 1,3-bis-carbamoylthio-2-piperidinopropane | 0.0125 / 0.025 | 1.2 / 0 |
| 1,3-bis-carbamoylthio-2-pyrrolidinopropane hydrochloride | 0.0125 / 0.025 | 1.5 / 0 |
| 1,3-dithiocyanato-2-dimethylaminopropane | 0.0125 / 0.025 | 0.7 / 0 |
| 1,3-dithiocyanato-2-dimethylaminopropane hydrogenoxalate | 0.0125 / 0.025 | 1.3 / 0 |
| 0,0-diethyl-0-p-nitrophenyl phosphorothioate | 0.0125 / 0.025 | 3.8 / 0 |
| Control | | 64.4 |

(5) For the purpose of testing acute toxicities to a homothermal animal of 1,3-dithiocyanate derivatives and 1,3-bis-carbamoylthio derivatives, the following test is performed:

Gum arabicum emulsion containing 10% (w./w.) of each test compound is administered orally to mice (CF$_1$-strain, male, four-weeks-old) and LD$_{50}$ and 95%-confidence limits are calculated by Lichfield-Wilcoxon method on the basis of the number of mice that died during 7 days after the administration. Results are as follows:

TABLE 6

| Test compound: | LD$_{50}$ (95%-C.L.) mg./kg. in mice |
|---|---|
| 1,3 - bis - carbamoylthio - 2 - dimethylaminopropane | 92 (82.9–102.1) |
| 1,3 - bis - carbamoylthio - 2 - dimethylaminopropane hydrochloride | 165 (138.6–196.3) |
| 1,3 - dithiocyanato - 2 - dimethylaminopropane | 12.2 (9.8–15.1) |

*Example.—Part III (the preparation of pesticidal compositions)*

(1) A solid pesticidal composition soluble in water is prepared by mixing 50 parts by weight of 1,3-bis-carbamoylthio - 2 - dimethylaminopropane hydrochloride and 50 parts by weight of lactose.

(2) A pesticidal solution is prepared by mixing 10 parts by weight of 1,3-bis-carbamoylthio-2-dimethylaminopropane, 2 parts by weight of laurylbenzene sulfonate and 73 parts by weight of methanol.

(3) A pesticidal emulsion is prepared by mixing 25 parts by weight of 1,3-bis-carbamoylthio-2-dimethylaminopropane, 25 parts by volume of sorbitan laurate polyoxyethylene ether (Tween 20) and 25 parts by volume of xylene.

(4) A pesticidal powder is prepared by mixing 2 parts by weight of 1,3-bis-carbamoylthio-2-piperidinopropane hydrogenoxalate and 98 parts by weight of talc.

We claim:

1. A compound selected from the class consisting of compounds of the formulae:

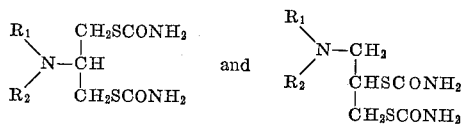

and salts thereof with acids, wherein each of R$_1$ and R$_2$ is independently alkyl of up to six carbon atoms, and R$_1$ and R$_2$ taken together with the adjacent nitrogen atom forms a member selected from the group consisting of piperidino, pyrrolidino, morpholino and thiamorpholino.

2. 1,3-bis-carbamoylthio-2-dimethylaminopropane.
3. 2,3-bis-carbamoylthio-1-dimethylaminopropane.
4. 1,3-bis-carbamoylthio-2-piperidinopropane.
5. 1,3-bis-carbamoylthio-2-morpholinopropane.
6. 1,3-bis-carbamoylthio-2-thiamorpholinopropane.

References Cited

FOREIGN PATENTS 976,729  12/1964  Great Britain.

ALEX MAZEL, *Primary Examiner.*

RICHARD J. GALLAGHER, *Assistant Examiner.*